United States Patent Office 2,950,671
Patented Aug. 30, 1960

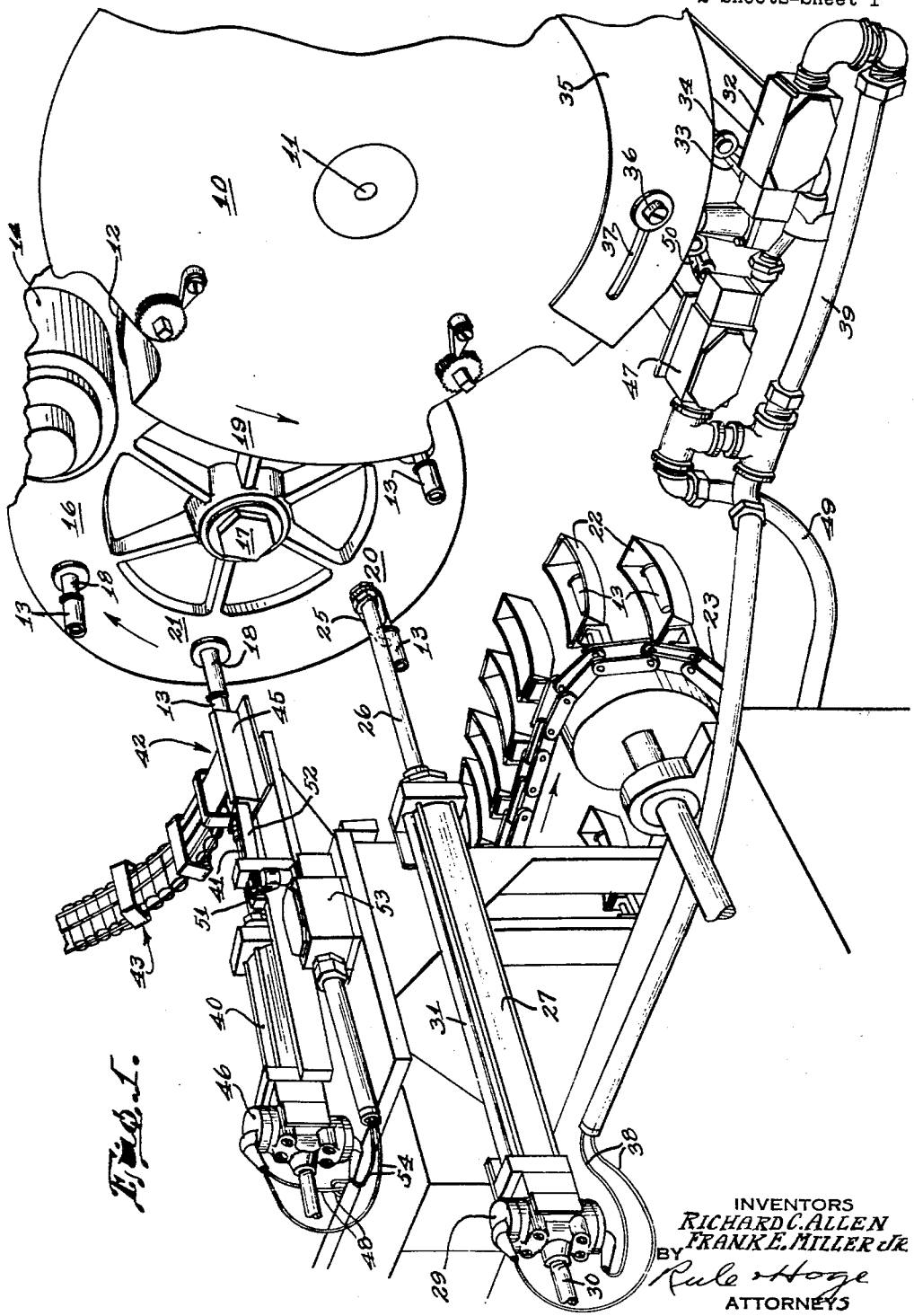

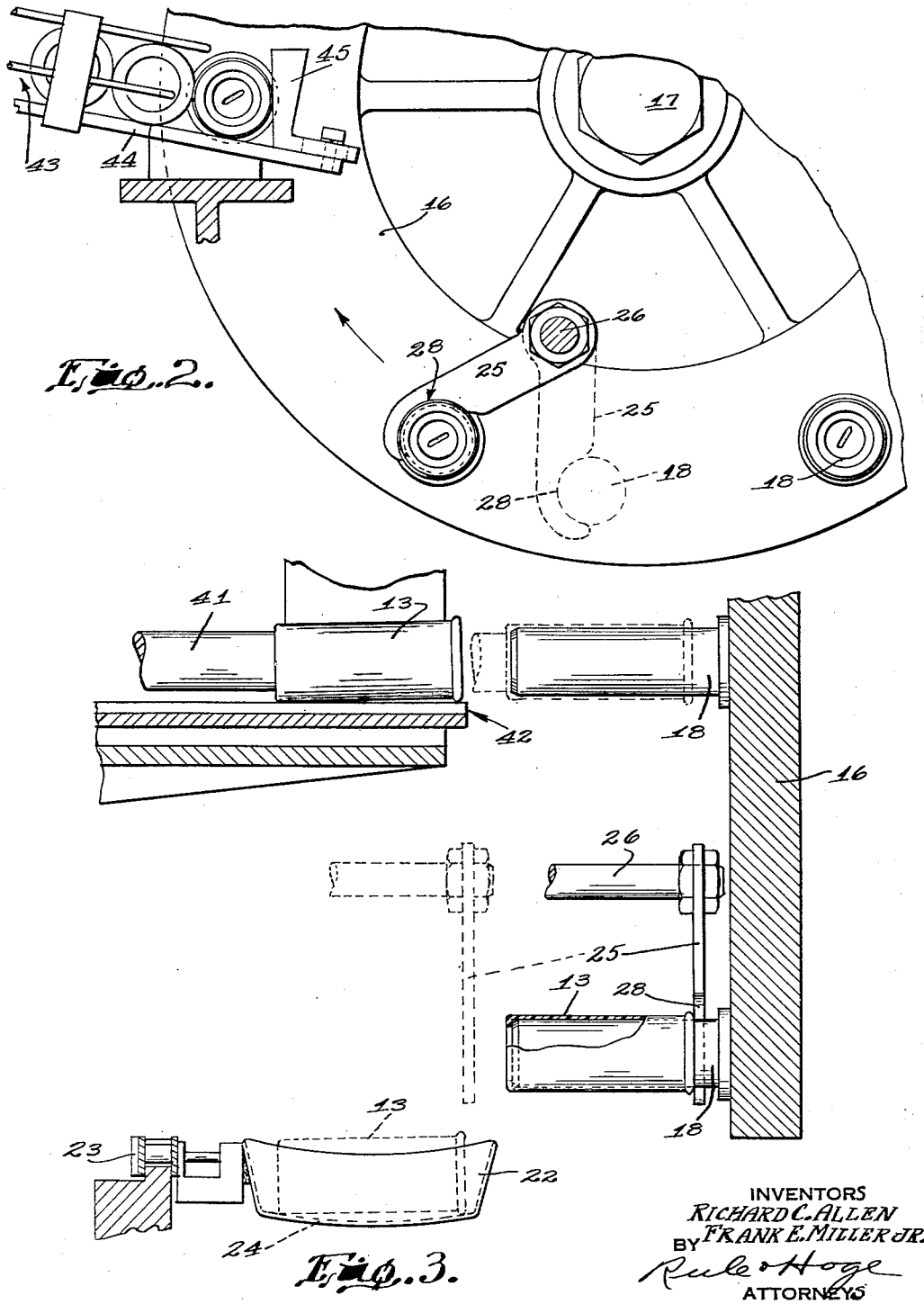

2,950,671

ARTICLE HANDLING APPARATUS FOR OFFSET PRINTERS

Richard C. Allen, Maumee, and Frank E. Miller, Jr., Toledo, Ohio, assignors to Owens-Illinois Glass Company, a corporation of Ohio Filed Mar. 17, 1958, Ser. No. 721,871

4 Claims. (Cl. 101—40)

The present invention relates to improvements in article handling apparatus for offset printers and more particularly is concerned with novel means for delivering unprinted vials or similar articles to and removing printed articles from such printers.

The conventional offset printer, when used for printing upon vials, open-ended cylinders or the like articles, is provided with freely rotatable spindles for supporting such vials, these spindles being mounted upon an intermittently rotating carrier. This carrier, with each advancing motion, brings a spindle with an article thereon to a printing station where a continuously moving conventional printing blanket peripherally engages and transfers color pigment to the surface in the desired pattern or design. These articles heretofore have been fed and removed manually and in some instances the spindles are cored to provide axial openings to which either air under pressure or vacuum may be applied. Air under pressure is used to remove bottomed vials or the like articles and vacuum aids in proper initial placement of such articles upon the spindles. Such procedure, however, is not adaptable to feeding or removing open-ended tubes and frequently air under pressure is insufficient to remove even bottomed vials. Also, it is evident that feeding is in part a manual operation and therefore relatively slow and objectionable.

An object of our invention is the provision of novel means for automatically removing articles, whether open-ended tubes or bottomed vials, from these spindles and additionally feeding or loading means for automatically placing such articles upon those spindles from which vials or the like articles have been removed.

A further object of our invention is the provision in apparatus of the above character of means whereby adjacent spindles of an annular series on the carrier respectively are positioned at take-out or delivery and loading stations and take-out and loading devices operating simultaneously to remove a printed article from one spindle and loading an article onto the adjacent spindle.

Other objects will be in part apparent and in part pointed out hereinafter.

Fig. 1 is a fragmentary perspective view showing our invention incorporated in a conventional offset printer.

Fig. 2 is a fragmentary side elevational view of the spindle carrier showing in part the take-out device or unloader and a portion of the loading means.

Fig. 3 is a fragmentary sectional elevational view showing the spindles in position for loading and unloading, together with fragments of the loader and unloader and one of the receptacles in which the removed printed articles are deposited.

In the illustrated embodiment of our invention, it is shown in association with part of a conventional offset printer, the details of which are well known and do not comprise any part of the herein claimed invention. Briefly, such machine comprises a continuously rotating blanket cylinder 10 mounted for rotation on a horizontal shaft 11. Inking of the blanket 12 is obtained by means of a plurality of identical conventional heads 14 (one only being shown) which transfer paint to the blanket in the desired pattern for subsequent application to the vials or tubes 13.

Adjacent the periphery of this blanket cylinder 10 is a work holder comprising an intermittently rotating spindle carrier 16 mounted upon a horizontal shaft 17 which is parallel to the axis of the blanket cylinder shaft 11. The work supporting spindles 18 project from one face of the carrier 16 in such position relative to the blanket cylinder that articles supported upon the spindles will peripherally contact the blanket 12 incident to rotation of said carrier. These spindles are freely rotatable about their own axes and do so rotate incident to their bringing a vial or tube 13 to the printing station 19 where they contact the continuously moving blanket 12. The spindles are spaced apart uniformly circumferentially of the carrier 16 and each time the latter comes to a stop position one spindle, with a vial or tube thereon, is at the printing station 19, another at the unloading station 20 where the article is removed, and still another spindle occupies the loading station 21 preparatory to receiving an unprinted vial or tube.

Discharged or unloaded printed articles are deposited by gravity in troughs or cups 22 which are mounted upon an endless chain 23. Advancing movement of the troughs is intermittent and synchronized with operation of the work holder so that an empty trough presents itself at the desired position each time a printed article is unloaded from a spindle. These troughs convey the printed articles to a discharge point (not shown). Each such trough has the bottom or floor 24 shaped so that only the extreme unprinted ends of the articles contact same. Thus smudging of the freshly applied paint is avoided.

Removal or unloading of the printed articles at the unloading station 20, in accordance with our invention, is obtained by means of a stripper finger 25. This finger is elongated and suspended from the free end of a carrier which specifically is a piston rod 26 of a horizontal air-operated piston motor 27. The stripper finger is a flat plate with one end mounted on the rod so that it can swing quite freely about the rod axis. The free end portion of this finger 25 is provided on one edge with a generally semi-circular recess 28 of such dimensions as to readily accommodate the inner end portion of a spindle 18 as indicated in Figs. 2 and 3. The recess 28 faces the approaching spindles so that as each spindle arrives at the unloading station 20 it enters said recess bringing the finger into position adjacent the externally beaded end of an article. As the spindle leaves the unloading station, the finger follows it for a short distance and then becomes disengaged and drops by gravity to the dotted line position of Fig. 2 for engagement with the next adjacent spindle.

The piston motor 27 which actuates the stripper finger 25 is of conventional form and at its outer end is provided with a standard solenoid valve 29 connected in customary fashion to a source of supply of air under pressure (not shown) by a conduit 30. The motor is also provided with a return conduit 31 extending along one side to an exhaust port (not shown) permitting reversal of the motor with completion of each unloading operation. Normally the motor projects the rod 26 so that the finger 25 is in position to engage a spindle. Retraction of the rod and finger is obtained by operation of the solenoid 29 such being accomplished by the closing of a normally open double-throw micro-switch 32 (Fig. 1) the actuating arm 33 of which carries a roller 34 designed for contact with a cam 35. This cam is mounted upon and adjustable circumferentially of the blanket cylinder 10. A set screw 36 and slot 37 provide for such adjustment. When the cam actuates the micro-switch 32 it operates through electric conductors 38 partially enclosed in the conduit 39 to operate the solenoid valve 29 and retract the piston rod 26 and finger 25. Thus the article is stripped from the spindle and deposited by gravity in one of the troughs. When the cam moves beyond the micro-switch it automatically opens and the solenoid valve 29 is reversed, as is conventional, and the motor again projects the finger to the full line position of Fig. 3.

Feeding or delivery of articles to the spindles at the loading station 21 just beyond the discharge station involves the use of a horizontal piston motor 40 in which the rod 41 functions as a ram to push vials or tubes 13 from a holder 42 onto the spindles. This holder 42 is at the discharge end of an inclined chute 43 and consists of a floor section 44 (Fig. 2) and abutment or stop 45 with which the articles are brought into engagement by gravity. In this position, they are axially aligned with a spindle while the latter is at rest in the loading position.

The piston motor 40 for the loader is horizontally positioned and at its outer end carries a conventional solenoid valve 46 for controlling the supply of air under pressure to the motor as well as the exhaust of air incident to reversal of the motor. This solenoid valve 46 is connected to a normally open double-throw micro-switch 47 by means of electric conductors 48 which may be at least partially enclosed in a conduit 49. A roller carrying switch arm 50 on the micro-switch 47 is actuated by the previously mentioned cam 35, thereby closing said switch and operating the solenoid valve 46. Thus air under pressure is admitted to the motor cylinder for advancing the ram or piston rod 41 and thereby transferring an article from the holder 42 (Fig. 3) to a spindle 18.

Substantially at the time the ram reaches its outermost position a finger 51 which is secured through an arm 52 to said ram trips and closes a normally open micro-switch 53. This switch upon closing operates through electric conductors 54 to actuate the solenoid valve 46 and reverse the motor 40. These micro-switches, solenoid valves and air-operated piston motors are staple items obtainable on the open market.

Reviewing the operation, the spindle carrier or work holder moves intermittently thereby presenting one tube carrying spindle at a time at the printing station for rolling contact with the blanket 12 of a continuously rotating blanket cylinder 10. Simultaneously another spindle with a printed article thereon occupies the unloading or stripping station 20 while a third spindle is positioned at the loading station 21 preparatory to receiving an unprinted article. Substantially at the moment the work holder comes to a standstill the cam 35 closes both micro-switches 32 and 47, such resulting in retraction of the unloading or stripping finger 25 and advancing of the loading ram 41. Thus unloading and feeding may occur almost simultaneously. The micro-switch 53 functions to reverse the loader bringing the outer end of the ram to a position substantially as indicated in full lines in Fig. 3. During the foregoing cycle of operations, the blanket cylinder has continued its rotary motion so that those micro-switches 32 and 47 again open and permit the piston motors 31 and 40 to resume their normal status. The articles as removed fall into the troughs 22.

Modifications may be resorted to within the spirit and scope of the appended claims.

We claim:

1. In printing or decorating apparatus comprising a continuously rotating blanket cylinder mounted upon a horizontal axis, a work holder comprising an intermittently rotating disk-like spindle carrier mounted on a horizontal axis near the periphery of said cylinder, an annular series of spindles on one face of the carrier near the periphery thereof and having their axes substantially parallel with that of the carrier, said work holder when at a standstill positioning one spindle at a printing station, another spindle at a work unloading station and a third spindle at a work loading station; the improvement comprising a work unloader including an air operated piston motor including a horizontal piston rod, a stripper finger suspended from and freely swingably connected to the latter, a solenoid valve for the motor, a work loader comprising an air operated piston motor, a ram actuated by the latter to deliver work to a spindle axially aligned with the ram, a solenoid valve for the last named motor, means including a plurality of micro-switches for actuating the solenoid valves and a cam carried by the blanket cylinder for operating at least certain of said micro-switches, the stripper finger being formed with a side recess normally in the path of travel of and to accommodate a portion of a spindle upon arrival of the latter at the unloading station.

2. In printing or decorating apparatus comprising a continuously rotating blanket cylinder mounted upon a horizontal axis, a work holder comprising an intermittently rotating disk-like spindle carrier mounted on a horizontal axis near the periphery of said cylinder, an annular series of spindles on one face of the carrier near the periphery thereof and having their axes substantially parallel with that of the carrier, said work holder when at a standstill positioning one spindle at a printing station, another spindle at a work unloading station and a third spindle at a work loading station; the improvement comprising a work unloader including an air operated piston motor, a stripper finger carried by the latter, a solenoid valve for the motor, a work loader comprising an air operated piston motor, a ram actuated by the latter to deliver work to a spindle axially aligned with the ram, a solenoid valve for the last named motor, means including a plurality of micro-switches for actuating the solenoid valves and a cam carried by the blanket cylinder for operating at least certain of said micro-switches, there being a piston rod normally projected so that its outer end is adjacent the spindle carrying face of the carrier and said finger is suspended from and freely rotatable on the outer end of the piston rod, the finger formed with a recess near its free end which each spindle enters as it arrives at the unloading station.

3. In printing or decorating apparatus comprising a continuously rotating blanket cylinder mounted upon a horizontal axis, a work holder comprising an intermittently rotating disk-like spindle carrier mounted on a horizontal axis near the periphery of said cylinder, an annular series of spindles on one face of the carrier near the periphery thereof and having their axes substantially parallel with that of the carrier, said work holder when at a standstill positioning one spindle at a printing station, another spindle at a work unloading station and a third spindle at a work loading station; the improvement comprising a work unloader including an air operated piston motor, a stripper finger carried by the latter, a solenoid valve for the motor, a work loader comprising an air operated piston motor, a ram actuated by the latter to deliver work to a spindle axially aligned with the ram, a solenoid valve for the last named motor, means including a plurality of micro-switches for actuating the solenoid valves and a cam carried by the blanket cylinder for operating at least certain of said micro-switches, the stripper finger normally being in position to engage a spindle and the ram normally being retracted preparatory to propelling a piece of work onto a spindle, and the micro-switches and solenoid valves operating to effect retraction of the finger to strip work from a spindle simultaneously with advancing of the ram to position work upon a spindle.

4. In printing or decorating apparatus comprising a continuously rotating blanket cylinder mounted upon a horizontal axis, a work holder comprising an intermittently rotating disk-like spindle carrier mounted on a horizontal axis near the periphery of said cylinder, an annular series of spindles on one face of the carrier near the periphery thereof and having their axes substantially parallel with that of the carrier, said work holder when at a standstill positioning one spindle at a printing station, another spindle at a work unloading station and a third spindle at a work loading station; the improvement comprising a work unloader including an air operated piston motor, a stripper finger carried by the latter, a solenoid valve for the motor, a work loader comprising an air operated piston motor, a ram actuated by the latter to deliver work to a spindle axially aligned with the rim, a solenoid valve for the last named motor, means including a plurality of micro-switches for actuating the solenoid valves and a cam carried by the blanket cylinder for operating at least certain of said micro-switches, and a micro-switch operable by the ram during its advancing movement to cause retraction of the ram.

References Cited in the file of this patent

UNITED STATES PATENTS

| | | |
|---|---|---|
| 2,072,840 | Temple | Mar. 2, 1937 |
| 2,088,196 | Friden | July 27, 1937 |
| 2,624,441 | Gapstur | Jan. 6, 1953 |
| 2,804,963 | Nowak | Sept. 3, 1957 |
| 2,835,371 | Davis | May 20, 1958 |
| 2,852,123 | Heidergott | Sept. 16, 1958 |